June 26, 1956  M. J. LEWIS ET AL  2,752,439

INFINITELY VARIABLE CONTROL SWITCH

Filed Dec. 28, 1953

*INVENTORS*
MERLE J. LEWIS &
BY THOMAS H. LENNOX

*Walter E. Kule*

THEIR ATTORNEY

United States Patent Office 2,752,439
Patented June 26, 1956

2,752,439

INFINITELY VARIABLE CONTROL SWITCH

Merle J. Lewis, Clinton, Iowa, and Thomas H. Lennox, New Albany, Ind., assignors to General Electric Company, a corporation of New York Application December 28, 1953, Serial No. 400,642

6 Claims. (Cl. 200—31)

This invention relates to electric switches and more particularly to switches of the type adapted to control the power supplied to an electric heating element or the like.

While not limited thereto, my improved control switch is particularly adapted to control the surface units of an electric range so that the wattage output of these units may be varied in small increments from zero to a predetermined maximum.

Infinitely variable heat control switches wherein the amount of current supplied to the heating unit is regulated by intermittently interrupting the circuit and varying the duration or frequency of the interruption are of course well known in the art. An important advantage of such switches as compared with heat control switches of the type having a limited number of separate and distinct positions to produce separate heats is the flexibility of control afforded thereby. Thus the wattage output of a heating element controlled by a so-called infinite heat switch may be varied in small increments and thereby may be regulated more nearly in accordance with the different heat losses from a particular cooking vessel or the different heats required by different cooking operations. However we have found that when such control switches are utilized to control range surface heating units in some instances they do not afford sufficiently precise heat control in the low heat range or a sufficiently low minimum wattage for certain warming operations. In other words the adjustment of such switches in the range from "off" to a low range position corresponding to approximately fifteen percent rated wattage output for example, is difficult to achieve with accuracy and the minimum heat provided is sometimes too high for the warming of light cooking loads.

Accordingly, a principal object of our invention is to provide an infinitely variable control switch which provides precise control throughout the entire range of the device.

Another object of our invention is to provide an infinitely variable control switch for regulating the power supplied to a heating element or the like which may be adjusted to provide an extremely low wattage output of the element.

Another object of our invention is to provide an improved infinitely variable control switch arranged to supply relatively high voltage power throughout one portion of its range of adjustment and relatively low voltage power throughout another portion of its range of adjustment.

Further objects and advantages of our invention will become apparent as the following description proceeds, and the features of novelty which characterise our invention will be pointed out with particularity in the claims appended to and forming a part of this specification.

Briefly stated, in one embodiment of our invention we provide a pair of movable cooperating contacts adapted to be connected in circuit with a heating element, a constant speed cam arranged to cause engagement and disengagement of the contacts, a manually adjustable cam for independently positioning one of the contacts so as to selectively vary the intervals during which they are in engagement, and a switch device operable between one position in which the heating element is connected to the outer conductors of a three conductor power source and another position in which the heating element is connected to an outer conductor and the neutral conductor. The manually adjustable cam includes two portions each providing separate ranges of adjustment and an actuator for the switch device so arranged that the heating element is energized at a relatively high voltage in one range of adjustment and at a relatively lower voltage in the other range of adjustment. By this means the heating element may be periodically energized at 118 volts, for example, in the low heat range and at 236 volts in the high heat range. . Preferably the highest wattage level in the low heat range corresponds to the lowest wattage level in the high heat range so that the wattage output is increased continuously as the cam is moved from the "off" position to the full wattage position.

For a better understanding of our invention reference may be made to the accompanying drawing in which.

Control switches of the character to which this invention relates are particularly adapted to control surface heating units of electric ranges, and as each surface unit must be individually controlled a separate circuit interrupter mechanism is required for each surface unit. These interrupter mechanisms may be conveniently arranged around a motor operated actuator as shown in Newell Patent No. 2,275,918, for example, so that the member serves as a common actuator for all the interrupter mechanisms. Electric ranges usually have four surface units and accordingly the four separate circuit interrupter mechanisms may be located respectively in the four corners of a case or housing at the center of which is a motor driven common actuator by which the four interrupter mechanisms are operated, each interrupter mechanism however being individually adjustable by a control knob to regulate the supply of power to the particular surface unit which it controls.

Figure 1:
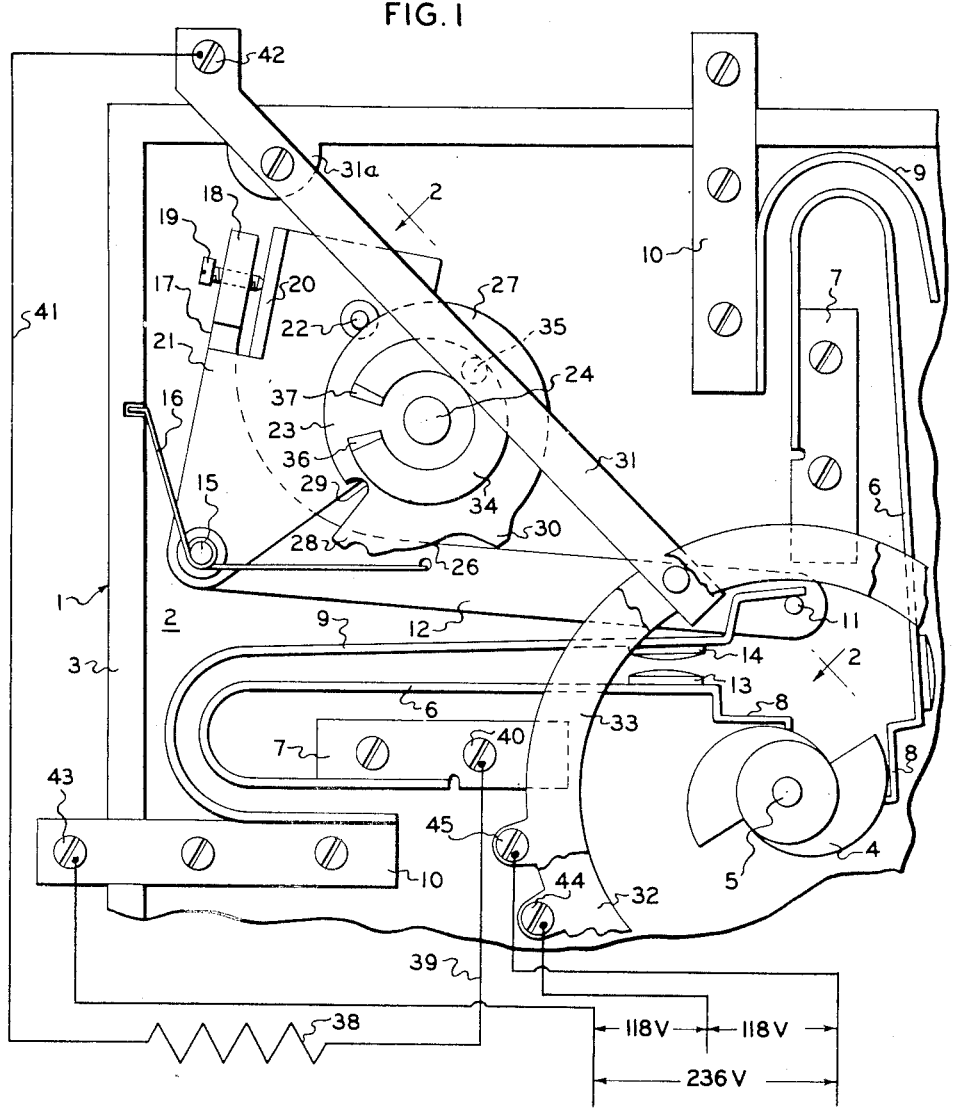
Fig. 1 is a fragmentary top plan view of a control switch constructed in accordance with our invention, the cover and control knob being removed.
Figure 2:
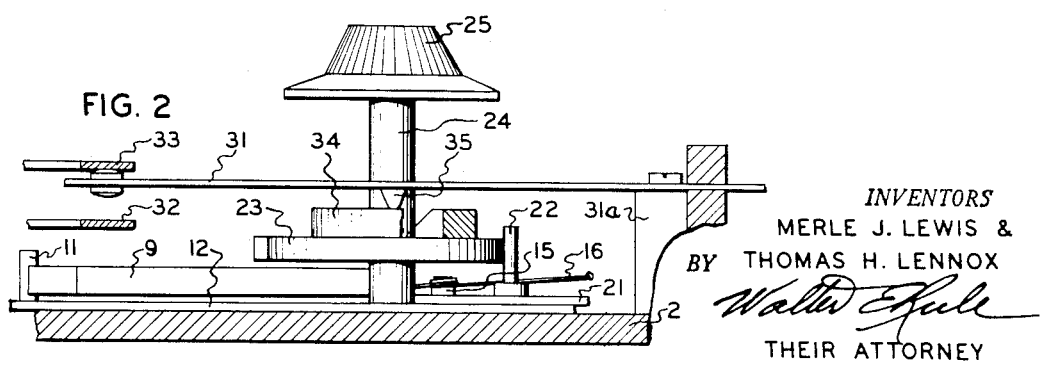
Fig. 2 is a fragmentary sectional view taken along the line 2—2 of Fig. 1.

Referring to the drawing, in which Fig. 1 shows one of the circuit interrupter mechanisms of such a multiple unit arrangement the reference numeral 1 designates a case or housing including a bottom wall 2 and a surrounding side wall 3 which support and enclose the various elements of the device. The housing 1 and the cover (not shown) are preferably of insulating material so that the various electrical conductors and terminals attached thereto are thereby electrically insulated from one another.

Centrally located in housing 1 is a cam 4 secured on a shaft 5 which is operated by a constant speed motor (not shown) at a slow constant rate of speed such as one revolution per minute. Each of the circuit interrupter mechanisms mounted in housing 1 includes a switch arm 6 supported at one end on the housing by means of a flange 7 and having at its free end a cam follower 8 in operative engagement with cam 4. Cam follower 8 is biased against cam 4 by the resilience of switch arm 6 and since cam 4 includes two semicircular portions the movement of arm 6 is a reciprocating movement at the rate of two cycles per revolution of shaft 5. Mounted in spaced parallel relation with respect to switch arm 6 is a cooperating switch arm 9 supported at one end on housing 1 by means of a flanged portion 10, its free end being biased by its own resilience into engagement with a pin 11 secured to the end of a link member 12. Mounted on switch arms 6 and 9 respectively are a pair of movable cooperating contacts 13 and 14, contact 13 being constantly reciprocated during rotation of cam 4 toward and away from contact 14.

Link member 12 is pivotally mounted on a shaft 15 secured to housing 1 and is biased so that it tends to rotate in a clockwise direction, as viewed in Fig. 1, by a biasing spring 16 coiled about shaft 15 and supported at one end in an aperture in wall 3. Link member 12 includes an arm portion 17 terminating in an enlarged portion 18 in which an adjusting screw 19 is mounted for engagement with the flange 20 of another link member 21. Link member 21 carries a cam follower 22 secured thereto for engagement with a manually adjustable cam member 23. From the preceding description it will be evident that cam follower 22 is moved in an arc about shaft 15 upon rotation of cam member 23, and by means of the linkage mechanism comprising link members 12 and 21 functions to position contact 14 so as to selectively vary the intervals during which contacts 13 and 14 are in engagement during rotation of cam 4. Cam member 23 is supported for rotation on a shaft 24 on which is also mounted a control knob 25. Inasmuch as cam follower 22 is biased into engagement with cam member 23 by spring 16 acting through link members 12 and 21, and switch arm 9 is biased into engagement with pin 11 on link 12, counterclockwise movement of cam follower 22 about pivot shaft 15 as a result of rotation of cam 23 causes switch contact 14 to move away from switch contact 13, thus shortening the intervals during which these contacts are in engagement. As contact 13 reciprocates toward and away from contact 14 switch arm 9 is free to move away from pin 11 during the intervals of engagement but its initial position is always determined by the position of link member 12.

One of the important features of our invention is the configuration of cam member 23 which provides two ranges of movement of switch arm 9 and contact 14. The cam surface of cam 23 includes one portion 26 providing a plurality of contact positions including a continuously disengaged position and another portion 27 providing a plurality of positions including a continuously engaged position. The continuously disengaged position, which of course corresponds to the "off" position of the mechanism, is provided by a high portion 28 on cam 23 while the continuously engaged position is provided by a low portion 29 which permits switch arm 9 to move into a position in which contact 14 is continuously engaged with contact 13 regardless of the reciprocating movement of switch arm 6. The cam surface of cam 23 also includes a raised portion 30 located intermediate cam surface portions 26 and 27, portion 30 being sufficiently high to maintain contacts 13 and 14 in spaced apart relation during movement of cam follower 22 between portions 26 and 27. It will be observed that portion 26 of the cam surface becomes progressively lower from high portion 28 to raised portion 30, and that likewise cam surface portion 27 becomes progressively lower from raised portion 30 to low portion 29.

In addition to switch arm 9, a contact arm 31 which moves in a plane perpendicular to the plane of movement of switch arms 6 and 9 is operated by rotary movement of control knob 25. Contact arm 31 is fixed at one end to a support 31a integral with side wall 3 of the housing and extends inwardly toward the central portion of the housing. The free end of arm 31 extends between a pair of spaced fixed contact members which as shown in the drawing may be a pair of spaced contact ring members 32 and 33 supported by suitable insulating means (not shown). Contact arm 31 is normally biased into engagement with fixed contact 32 but may be moved into engagement with fixed contact 33 by means now to be described.

Formed on the top surface of cam member 23 is a switch actuator 34 comprising a raised flat arcuate cam surface extending in an arc substantially equal to the arc encompassed by cam surface portion 27. Cooperating with switch actuator 34 is a follower 35 secured to the mid-portion of arm 31. It will be noted that the two ends of actuator 34 terminate in inclined portions 36 and 37 which permit follower 35 to travel from the top surface of cam 23 to the raised surface of the actuator and vice versa upon rotation of cam 23. Actuator 34 is positioned on cam 23 so that follower 35 rides on the top surface of the cam (between the two inclined portions 36 and 37) when follower 22 engages cam surface portion 26, and on actuator 34 when follower 22 engages cam surface portion 27. Thus actuator 34 cooperates with follower 35 to move contact arm 31 from a first position in engagement with fixed contact 32 when cam follower 22 engages cam portion 26 to a second position in engagement with fixed contact 33 when cam 23 is rotated to a position in which follower 22 engages cam portion 27. In the drawing the parts are shown in the position in which arm 31 is held in engagement with fixed contact 33 and cam 23 is in the range of movement in which follower 22 engages cam portion 27.

Referring now to the electrical circuit arrangement shown in Fig. 1, a resistance heating element 38 is connected to the control switch mechanism described above by means of wire 39 connected to terminal 40 of switch arm 6 and wire 41 connected to terminal 42 of contact arm 31. Terminal 43 of switch arm 9 is connected to one of the outer conductors of a three conductor source of power, while terminal 44 of fixed contact ring 32 and terminal 45 of fixed contact ring 33 are connected to the neutral conductor and the other outer conductor respectively. Thus it will be observed that contacts 13 and 14 are connected in series with heating element 38 and that the heating element may be energized at a relatively high voltage or a relatively low voltage depending upon whether contact arm 31 is in engagement with fixed contact 32 or fixed contact 33. While the arrangement is not shown in the drawing it will be apparent to those skilled in the art that the constant speed motor which drives shaft 5 may be connected in circuit with an electric switch operated by rotation of shaft 24. With such an arrangement the motor driven shaft 5 would be de-energized whenever cam 23 is in the "off" position but automatically energized upon the movement of control knob 25 to any heating position.

In considering the operation of our invention it will first be assumed that cam 23 is in the "off" position, i. e. that high portion 28 is in engagement with cam follower 22, and that a low heat output from heating element 38 is desired. This is obtained by rotating control knob 25 clockwise sufficiently to cause cam surface portion 26 to engage follower 22 thus permitting switch arm 9 and contact 14 to move toward contact 13 sufficiently to permit periodic engagement of the contacts as cam 4 is rotated. With cam 23 in this position follower 35 engages the top surface of the cam between the two ends of actuator 34 and thus the free end of contact arm 31 is in engagement with fixed contact ring 32. With control knob 25 in this position heating element 38 is periodically energized at a relatively low voltage, 118 volts for example, the duration of the intervals of engagement being dependent on the exact position of cam 23. As knob 25 is rotated clockwise the intervals of engagement of contacts 13 and 14 are lengthened since contact 14 is moved progressively toward contact 13 by the accompanying movement of cam 23.

If a relatively high heat output is required clockwise rotation of knob 25 is continued until cam portion 27 engages cam follower 22 and contact arm 31 is actuated by actuator 34 into engagement with fixed contact ring 33. With the cam 23 in this range of positions heating element 38 is periodically energized at a relatively high voltage, 236 volts for example, the duration of the intervals of engagement of contacts 13 and 14 depending upon the exact position of the cam 23.

It will be noted that the switchover from low to high voltage or vice versa effected by movement of contact arm 31 is always made when contacts 13 and 14 are disengaged, thus eliminating the possibility of destructive arcing between contact members 31, 32 and 33. This is achieved by raised portion 30 of cam 23 which maintains contacts 13 and 14 in spaced apart relation during movement of cam follower 22 between portions 26 and 27. Raised portion 30 is of course oriented with respect to the end of actuator 34 so that contact 14 is lifted completely out of the range of movement of contact 13 when contact arm 31 is moved by actuator 34.

From the preceding description it will be seen that we have provided an improved control switch for heating units and the like which supplies relatively low voltage power throughout its low heat range of adjustment and relatively high voltage power throughout its high heat range of adjustment. It will be evident that by operating the heating element on 118 volts in the low heat range rather than 236 volts, the minimum wattage obtainable is decreased by a factor of 4. For example if the switch is designed to provide a minimum "on" time of three percent during each cycle of operation of contacts 13 and 14, the minimum wattage obtainable from a 1600 watt unit at 236 volts is 48 watts. By operating the unit on 118 volts in the low heat range the minimum obtainable wattage is 12 watts. Furthermore our invention insures more precise control in the low heat range inasmuch as the wattage of the heating unit is increased in smaller increments at low voltage. Thus in the embodiment of the invention described above if one degree of rotation of control knob 25 corresponds to a wattage change of 8 watts in the high heat range, the same angular adjustment would effect a change of only 2 watts in the low heat range.

While we have shown and described a specific embodiment of our invention, we do not desire our invention to be limited to the particular construction shown and described and we intend by the appended claims to cover all modifications within the true spirit and scope of our invention.

What we claim as new and desire to secure by Letters Patent of the United States is:

1. In a device for periodically supplying current to a heating element or the like for selectively variable intervals of time, the combination of first and second movable cooperating contacts adapted to be connected in circuit with said heating element, continuously operable means for periodically moving said first contact toward and away from said second contact, manually adjustable means for positioning said second contact so as to selectively vary the intervals during which said contacts are in engagement, said adjustable means including means providing first and second ranges of movement in each of which said second contact is movable to a plurality of positions including a series of positions common to both of said ranges of movement, switch means operable by said adjustable means for connecting said heating element to a relatively low voltage source of energy when said adjustable means is in said first range of movement and to a relatively high voltage source of energy when said adjustable means is in said second range of movement, and means for maintaining said contacts in spaced apart relation upon movement of said adjustable means between said first and second ranges of movement.

2. In a device for periodically supplying current to a heating element or the like for selectively variable intervals of time, the combination of first and second movable cooperating contacts adapted to be connected in circuit with said heating element, continuously operable means for periodically moving said first contact toward and away from said second contact, manually adjustable means for positioning said second contact so as to selectively vary the intervals during which said contacts are in engagement, said adjustable means including means providing first and second ranges of movement in each of which said second contact is movable to a plurality of positions including a series of positions common to both of said ranges of movement, a switch actuator movable with said adjustable means, first and second fixed contacts adapted to be connected to a relatively low and a relatively high voltage source respectively, a movable contact arm operable by said actuator between a first position in engagement with said first fixed contact and a second position in engagement with said second fixed contact, said contact arm being adapted to be connected in circuit with said heating element, and said actuator being constructed and arranged so that said contact arm is in said first position when said adjustable means is in said first range of movement and in said second position when said adjustable means is in said second range of movement.

3. In a device for periodically supplying current to a heating element or the like for selectively variable intervals of time, the combination of first and second movable cooperating contacts adapted to be connected in circuit with said heating element, continuously operable means for periodically moving said first contact toward and away from said second contact, linkage means including a cam follower for positioning said second contact so as to selectively vary the intervals during which said contacts are in engagement, a manually adjustable cam member including a cam surface in operative engagement with said cam follower, said cam surface including a first portion providing a plurality of positions of said second contact and a second portion also providing a plurality of said positions including a series of positions substantially identical with a series of positions provided by said first cam portion, first and second fixed contacts adapted to be connected to a relatively low and a relatively high voltage source respectively, a movable contact arm operable between a first position in engagement with said first fixed contact and a second position in engagement with said second fixed contact, said contact arm being adapted to be connected in circuit with said heating element, and an actuator for said contact arm carried by said cam member and arranged so that said contact arm is moved into said first position when said first portion of said cam surface is in engagement with said cam follower and into said second position when said second portion of said cam surface is in engagement therewith.

4. In a device for periodically supplying current to a heating element or the like for selectively variable intervals of time, the combination of first and second movable cooperating contacts adapted to be connected in circuit with said heating element, continuously operable means for periodically moving said first contact toward and away from said second contact, linkage means including a cam follower for positioning said second contact so as to selectively vary the intervals during which said contacts are in engagement, a manually adjustable cam member including a cam surface in operative engagement with said cam follower, said cam surface including a first portion providing a plurality of positions of said second contact, a second portion also providing a plurality of said positions including a series of positions substantially identical with a series of positions provided by said first cam portion, and a third portion intermediate said first and second portions for maintaining said contacts in spaced apart relation regardless of the position of said continuously operable means, and switch means including actuating means operable upon movement of said cam member for connecting said heating element to a relatively low voltage source of energy when said first portion of said cam surface is in engagement with said cam follower and to a relatively high voltage source of energy when said second portion of said cam surface is in engagement with said cam follower.

5. In a device for periodically supplying current to a heating element or the like for selectively variable intervals of time, the combination of first and second movable cooperating contacts adapted to be connected in circuit with said heating element, continuously operable means for periodically moving said first contact toward and away from said second contact, linkage means including a cam follower for positioning said second contact so as to selectively vary the intervals during which said contacts are in engagement, a manually adjustable cam member including a cam surface in operative engagement with said cam follower, said cam surface including a first portion providing a plurality of positions of said second contact and a second portion also providing a plurality of said positions including a series of positions substantially identical with a series of positions provided by said first cam portion, first and second fixed contacts adapted to be connected to a relatively low and a relatively high voltage source respectively, a movable contact arm operable between a first position in engagement with said first fixed contact and a second position in engagement with said second fixed contact, said contact arm being adapted to be connected in circuit with said heating element, an actuator for said contact arm carried by said cam member and arranged so that said contact arm is moved into said first position when said first portion of said cam surface is in engagement with said cam follower and into said second position when said second portion of said cam surface is in engagement therewith, and means carried by said cam member for maintaining said movable contacts in spaced apart relation during movement of said contact arm between said first and second positions.

6. In a device for independently controlling the supply of current to a plurality of heating elements or the like, the combination of a continuously operable cam, a separate pair of movable contacts for each heating element, each pair of contacts having a member operable by the cam to cause intermittent engagement and disengagement of the respective pairs of contacts, said members being uniformly spaced about the cam, separate linkage means each including a cam follower for positioning one of each of the pairs of contacts so as to selectively vary the intervals during which they are in engagement, a manually adjustable cam for each of the linkage means including a cam surface in operative engagement with its cam follower, said cam surface including a first portion providing a plurality of positions of the contact positioned by said cam follower including a continuously disengaged position, a second portion providing a plurality of said positions including a series of positions substantially identical with a series of positions provided by said first cam portion and a continuously engaged position and a third portion intermediate said first and second portions for maintaining the pair of contacts in spaced apart relation during movement of the cam follower between said first and second portions, first and second fixed contact members adapted to be connected to a relatively low and a relatively high voltage source respectively, separate movable contact arms each adapted to be connected in circuit with one of said plurality of heating elements, said contact arms being separately operable between a first position in engagement with said first fixed contact member and a second position in engagement with said second fixed contact member, and separate actuators for said contact arms carried by said manually adjustable cams and arranged so that each contact arm is moved into said first position when the first cam surface portion of the cam on which its actuator is carried is in engagement with its cam follower and into said second position when the second cam surface portion thereof is in engagement with said cam follower.

References Cited in the file of this patent

UNITED STATES PATENTS

| | | |
|---|---|---|
| 2,194,587 | Brown et al. | Mar. 26, 1940 |
| 2,215,404 | Myers | Sept. 17, 1940 |
| 2,275,918 | Newell | Mar. 10, 1942 |
| 2,294,573 | Potter | Sept. 1, 1942 |
| 2,503,082 | Tuttle | Apr. 4, 1950 |
| 2,572,553 | Wojcik | Oct. 23, 1951 |
| 2,599,171 | Freeman | June 3, 1952 |